United States Patent
Li et al.

(10) Patent No.: US 7,711,170 B2
(45) Date of Patent: May 4, 2010

(54) METHOD AND SYSTEM FOR FILTERING SCAN DATA

(75) Inventors: Jianying Li, New Berlin, WI (US);
Jiang Hsieh, Brookfield, WI (US)

(73) Assignee: General Electric Company, Schenectady, NY (US)

( * ) Notice: Subject to any disclaimer, the term of this patent is extended or adjusted under 35 U.S.C. 154(b) by 1394 days.

(21) Appl. No.: 11/126,086

(22) Filed: May 10, 2005

(65) Prior Publication Data

US 2006/0257011 A1 Nov. 16, 2006

(51) Int. Cl.
*G06K 9/00* (2006.01)
*G06K 9/40* (2006.01)
*A61B 6/00* (2006.01)
*G01N 23/00* (2006.01)
*G21K 1/12* (2006.01)
*H05G 1/60* (2006.01)

(52) U.S. Cl. .................. 382/131; 382/132; 382/260; 382/264; 378/4; 378/21

(58) Field of Classification Search ............... 382/131, 382/260
See application file for complete search history.

(56) References Cited

U.S. PATENT DOCUMENTS

| | | | | |
|---|---|---|---|---|
| 4,580,219 A * | 4/1986 | Pelc et al. | ...... | 382/131 |
| 5,416,815 A * | 5/1995 | Hsieh | ...... | 378/4 |
| 5,530,731 A * | 6/1996 | Polacin et al. | ...... | 378/15 |
| 5,533,091 A * | 7/1996 | Hsieh | ...... | 378/210 |
| 5,671,263 A * | 9/1997 | Ching-Ming | ...... | 378/8 |
| 5,680,426 A * | 10/1997 | Ching-Ming | ...... | 378/8 |
| 5,987,347 A | 11/1999 | Khoury et al. | | |
| 6,449,330 B1 * | 9/2002 | Li et al. | ...... | 378/4 |
| 2002/0028008 A1 * | 3/2002 | Fan et al. | ...... | 382/131 |
| 2004/0267114 A1 * | 12/2004 | Mundy et al. | ...... | 600/427 |
| 2005/0078791 A1 | 4/2005 | Li | | |

* cited by examiner

*Primary Examiner*—Andrew W Johns
*Assistant Examiner*—Jose M Torres
(74) *Attorney, Agent, or Firm*—Armstrong Teasdale LLP

(57) ABSTRACT

Methods and systems for filtering scan data are provided. The method includes generating scan data from a plurality of signals. The method further includes adjusting an initial filtering threshold, independent of an amplitude of the signals, to generate an adjusted threshold. Furthermore, the method includes filtering the scan data, based on the adjusted threshold.

16 Claims, 8 Drawing Sheets

METHOD AND SYSTEM FOR FILTERING SCAN DATA

CROSS-REFERENCE TO RELATED APPLICATIONS

This application is related to U.S. patent application having Ser. No. 10/683,037, now U.S. Pat. No. 6,931,094, titled "Methods and Systems for Smoothing", and filed on Oct. 10, 2003.

BACKGROUND OF THE INVENTION

This invention relates generally to medical imaging systems and, more particularly, to methods and systems for filtering scan data in medical imaging systems.

In computed tomography (CT) systems, an X-ray source emits a fan-shaped beam toward an object such as a patient or a piece of luggage. The beam is attenuated by the object. The attenuated beam impinges upon an array of radiation detectors. The intensity of the attenuated beam radiation received at the detector array depends upon the attenuation of the X-ray beam by the object. Each detector element of the detector array produces a separate electrical signal that is indicative of the attenuated beam received by each detector element. The electrical signals are transmitted to a data processing system for analysis, which results in the formation of a plurality of images.

In cardiac CT systems, directional streaks lined up with ventricles, aorta and a vertebra are visible in the generated images. These artifacts are more pronounced when a contrast agent is used. Further, the existence of streaking artifacts may cause a noise-induced banding artifact in the images, preventing doctors from using scans with a low dose of X-ray radiation.

BRIEF DESCRIPTION OF THE INVENTION

In one exemplary embodiment, a method for filtering scan data is provided. The method includes generating scan data from a plurality of signals. The method further includes adjusting an initial filtering threshold, independent of an amplitude of signals, to generate an adjusted threshold. Furthermore, the method includes filtering the scan data, based on the adjusted threshold.

In another exemplary embodiment, a computed tomography (CT) system is provided. The CT system includes a detector that is configured to receive a plurality of signals. The CT system further includes a data acquisition system that is configured to generate scan data from the received signals. In addition, the CT system includes a smoothing processor, which is configured to adjust an initial filtering threshold that is independent of an amplitude of the signals. Further, the smoothing processor is configured to generate an adjusted threshold from the initial filtering threshold. Furthermore, the smoothing processor is configured to filter the scan data, based on the adjusted threshold.

DETAILED DESCRIPTION OF THE INVENTION

Various embodiments of the present invention provide methods and systems for filtering scan data in the images generated in a medical imaging system. The medical imaging system may be a single photon emission computed tomography (SPECT) system, a computed tomography (CT) system, a positron emission tomography (PET) imaging system, and so forth.

In a CT system, an X-ray source projects a fan-shaped beam, which is collimated to lie within an X-Y plane of a Cartesian coordinate system. The X-Y plane is generally referred to as an 'imaging plane'. The X-ray beam passes through an object such as a patient. The object attenuates the beam. The attenuated beam impinges upon an array of radiation detectors. The intensity of the attenuated radiation beam received at the detector array depends upon the attenuation of the X-ray beam by the object. Each detector element of the array produces a separate electrical signal, which is a measurement of the beam intensity at the detector location. The measurement of the intensity from each detector is acquired separately to produce a transmission profile.

Figure 1:
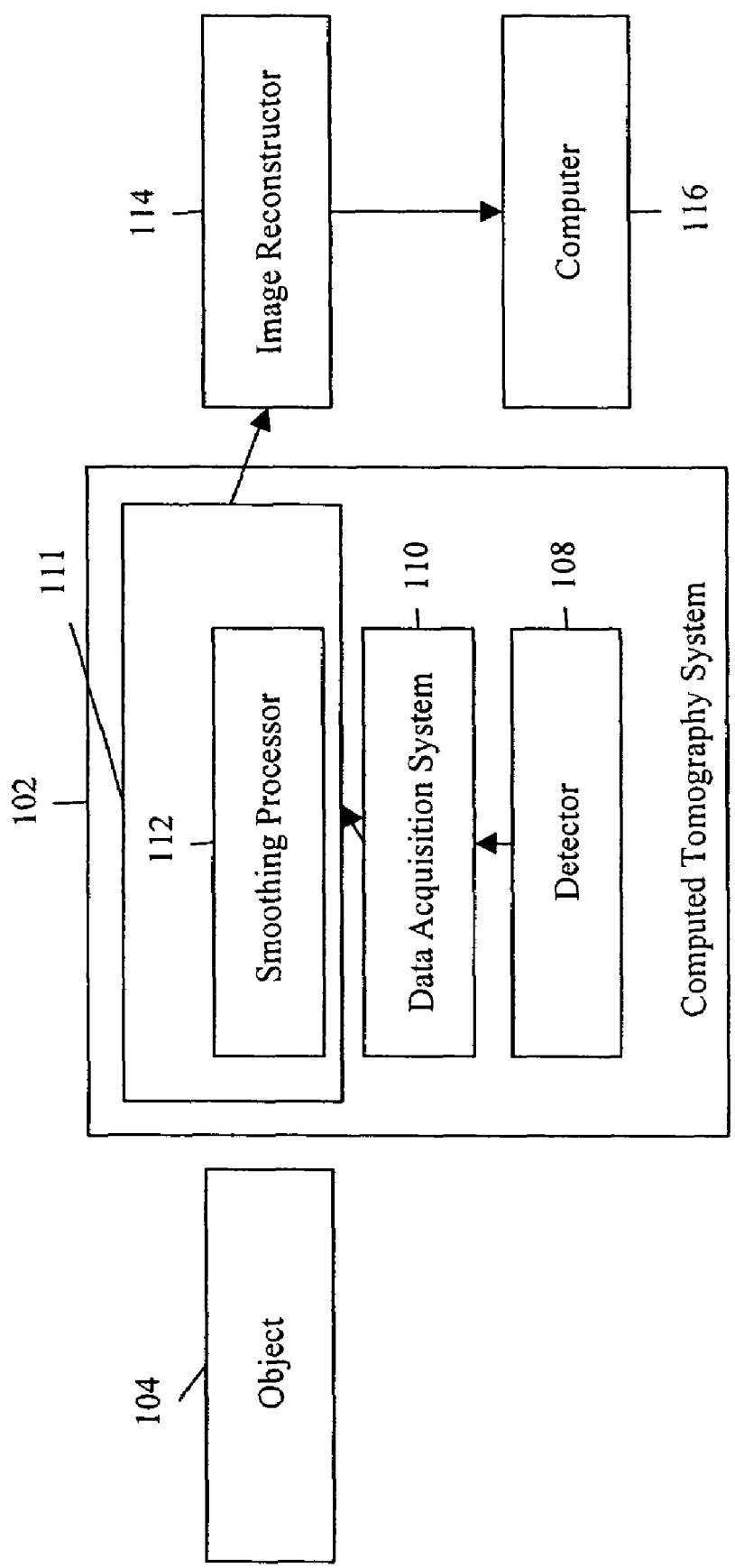
FIG. 1 illustrates a computed tomography (CT) imaging system, in which various embodiments of the present invention can be implemented.

FIG. 1 illustrates a computed tomography (CT) imaging system 102, in which various embodiments of the present invention can be implemented. CT system 102 includes a detector 108, a data acquisition system 110, and a pre-processor 111 including a smoothing processor 112. CT system 102 scans an object 104. CT system 102 may provide anatomic images or functional information pertaining to object 104. Object 104 may be a heart, a vertebra, an aorta, a liver, a lung, and so forth. Examples of detector 108 are scintillation crystal-photodiode arrays, high-pressure xenon gas ionization chambers, and so forth. Detector 108 includes a plurality of detector rows (not shown) and channels (not shown) in a detector array. The detector rows and channels include a plurality of detector elements (not shown). The plurality of detector elements sense the projected X-rays that pass through object 104.

A group of X-ray attenuation measurements, i.e., projection data, from the detector array at one gantry angle is referred to as a "view." A "scan" of object 104 includes a set of views made at different gantry angles, or view angles, during one revolution of an X-ray source and detector 108.

Data acquisition system 110 generates scan data from signals received from detector 108. Data acquisition system 110 generates the scan data by sampling the signals from detector 108 and converting the sampled signals to digital signals, which are the scan data. Pre-processor 111 receives the scan data from DAS 110 to pre-process the scan data. In one embodiment, pre-processing includes, but is not limited to, an offset correction, a primary speed correction, a reference channel correction, an air-calibration, applying the methods for filtering scan data and/or applying a negative logarithmic operation. In another embodiment, the scan data is pre-processed up to the negative logarithmic operation and methods for filtering scan data are applied before applying the negative logarithmic operation. Smoothing processor 112 executes a method for filtering scan data to generate filtered scan data. Pre-processor 111 pre-processes the scan data to generate pre-processed data.

The term processor, as used herein, is not limited to just those integrated circuits referred to in the art as computers, but broadly refers to microcontrollers, microcomputers, programmable logic controllers, application specific integrated circuits, and other programmable circuits, and these terms are used interchangeably herein.

An image reconstructor 114 receives the pre-processed data from pre-processor 111. Image reconstructor 114 further performs high-speed image reconstruction to reconstruct images from the pre-processed data. The reconstructed images are applied as an input to a computer 116. Computer 116 stores the reconstructed images.

Figure 2:
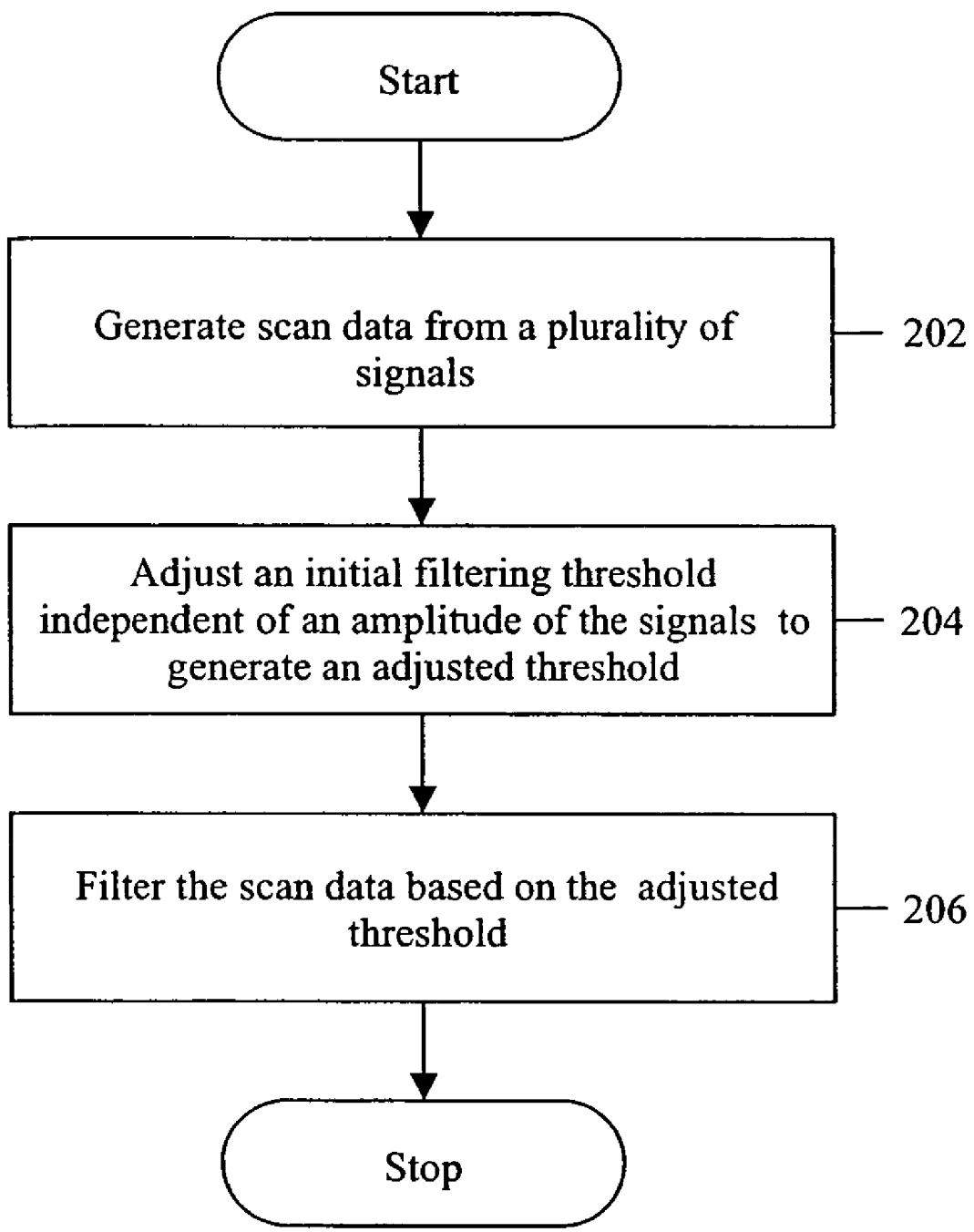
FIG. 2 is a flowchart illustrating a method for filtering scan data, in accordance with an exemplary embodiment of the invention.

FIG. 2 is a flowchart illustrating a method for filtering scan data, in accordance with an exemplary embodiment of the invention. At 202, the scan data is generated from a plurality of signals. The plurality of signals is received from detector 108. At 204, an initial filtering threshold is adjusted. The initial filtering threshold is adjusted by changing the initial filtering threshold based on a pre-determined range in which a view angle is located. The view angle is located within a region selected for imaging. In an embodiment of the present invention, the view angle may be located between ranges vtc-vt1, −360°-vtc, vt2-0, vb2-vbc, vbc-vb1, and all subranges there between. The view angle has been described in conjunction with FIG. 3.

The initial filtering threshold is adjusted independent of the amplitude of the signals received from detector 108. At 206, the scan data is filtered based on the adjusted threshold. In one embodiment, the scan data is filtered preceding to the negative logarithmic operation. In an alternative embodiment, the scan data is filtered before the negative logarithmic operation.

Smoothing processor 112 may be configured to adjust the initial filtering threshold independent of the amplitude of the signals. Smoothing processor 112 may be configured to adjust the initial filtering threshold by changing the initial filtering threshold based on a pre-determined range in which a view angle is located. In addition, smoothing processor 112 may also be configured to filter the scan data based on the adjusted threshold.

Figure 3:
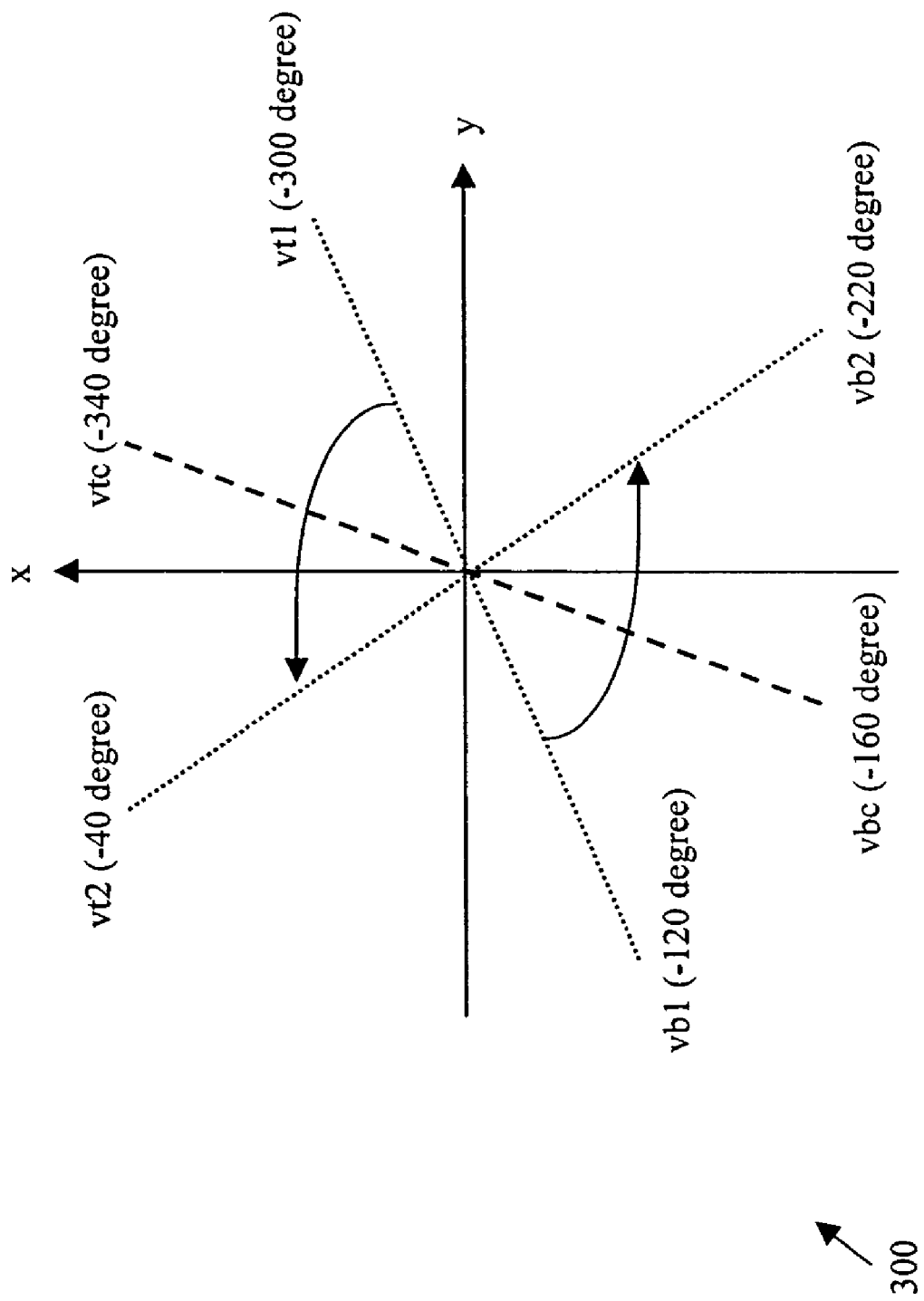
FIG. 3 illustrates a view angle selection for threshold adjustment, in accordance with an exemplary embodiment of the invention.

FIG. 3 illustrates a view angle selection for threshold adjustment, in accordance with an exemplary embodiment of the invention. The initial filtering threshold is adjusted based on a view angle located between range vtc-vt1, −360°-vtc, vt2-0, vb2-vbc, vbc-vb1, and all subranges there between. In an exemplary embodiment of the present invention, vt2 ranges from −30° to −50°, vtc ranges from −330° to −350°, vt1 ranges from −290° to −310°, vb2 ranges from −210° to −230°, vbc ranges from −150° to −170°, and vb1 ranges from −110° to −130°. In an embodiment of the invention, the directional streaks are the highest for a view angle between vt1 and vt2.

Figure 4:
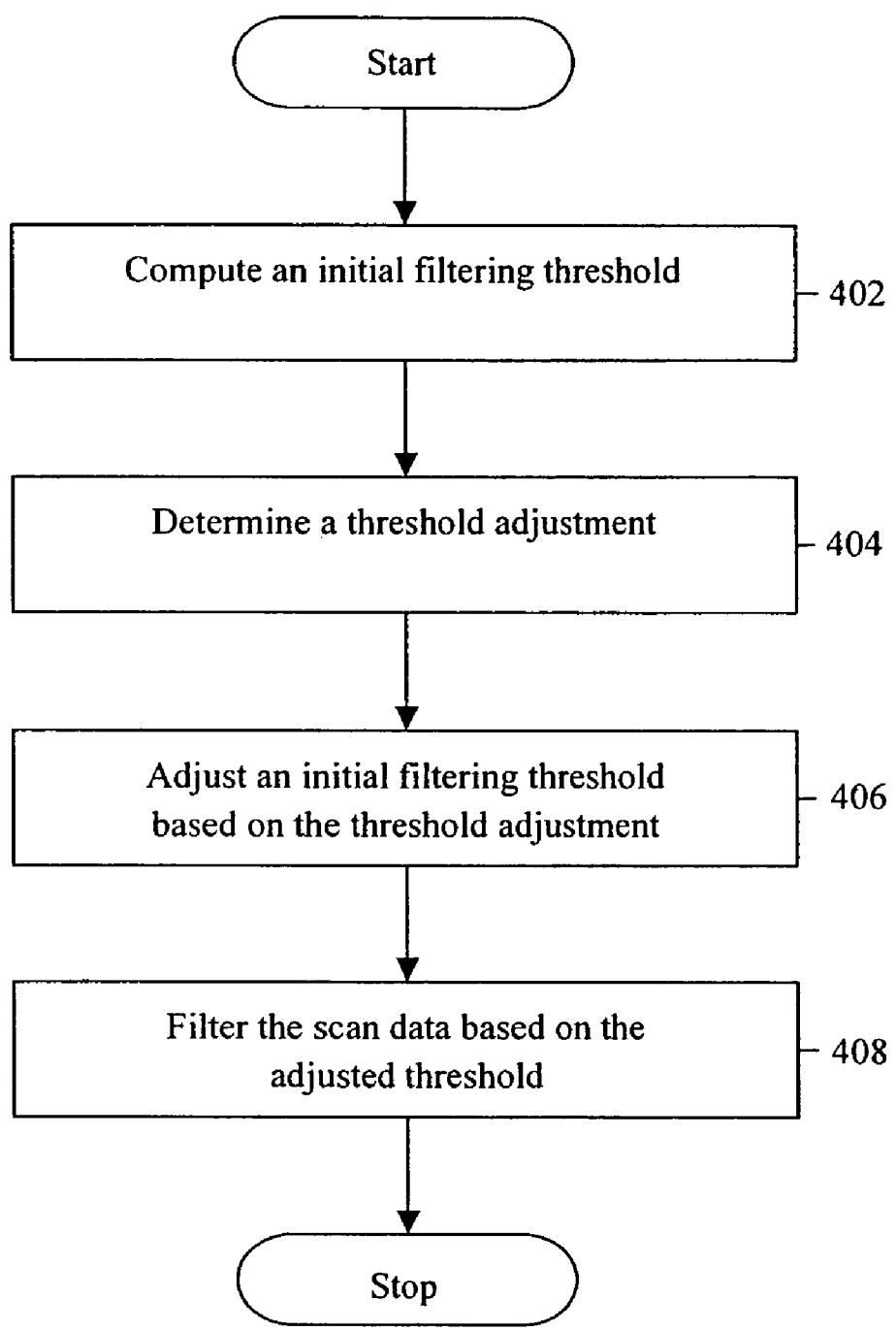
FIG. 4 is a flowchart illustrating a method for filtering scan data, in accordance with another exemplary embodiment of the invention.

FIG. 4 is a flowchart illustrating a method for filtering scan data, in accordance with another exemplary embodiment of the invention. At 402, the initial filtering threshold, such as one of three thresholds, Th, Tm, and Tl, is computed by smoothing processor 112. In an embodiment of the present invention, the initial filtering threshold may be computed in accordance with equations (1), (2), and (3):

$$Th = \exp(-thh), \quad (1)$$

$$Tm = \exp(-thm), \text{ and} \quad (2)$$

$$Tl = \exp(-thl), \quad (3)$$

where thh, thm and thl are threshold indexes and one of thl, thIn and thn is input into smoothing processor 112. In an embodiment of the present invention, the threshold indexes may be related in accordance with equations (4), and (5):

$$thh = thm - ath, \text{ and} \quad (4)$$

$$thl = thm + bth. \quad (5)$$

In an embodiment of the present invention, the values of thh, thm, and thl may range from 3 to 10. In another exemplary embodiment of the present invention, the values of the threshold indexes are thh=6.4, thm=6.9, and thl=7.4. The parameters ath and bth are constants input into smoothing processor 112. In an embodiment of the present invention, the values of ath may range from 0 to 2 and the values of bth may range from 0 to 2. In another exemplary embodiment of the present invention, the values of the parameters are ath=0.5, and bth=0.5. In an embodiment of the present invention, one, two, or all of thresholds, Th, Tm, and Tl, may be computed by smoothing processor 112. In another embodiment of the present invention, more than three thresholds may be computed by smoothing processor 1 12.

At 404, a threshold adjustment is determined. The threshold adjustment tha(θ) is determined for a view angle located within the region selected for imaging. In an embodiment of the present invention, tha(θ) is determined for a view angle θ located in view angle selection 300. In an embodiment of the present invention, tha(θ) may be computed by smoothing processor 112 in accordance with equations (6), (7), (8), (9) and (10)

$$rvv(\theta) = abs(abs(\theta - vbc)) - 180)/(vt1 - vtc), \text{ when } vtc < \theta < vt1 \quad (6)$$

$$rvv(\theta) = abs(abs(\theta - vbc)) - 180)/(vtc + 360 - vt2), \text{ when } -360 < \theta < vtc \text{ or } vt\theta2 < \theta < \theta \quad (7)$$

$$rvv(\theta) = abs(abs(\theta - vtc)) - 180)/(vb1 - vbc), \text{ and when } vbc < \theta < vb1 \quad (8)$$

$$rvv(\theta) = abs(abs(\theta - vtc)) - 180)/(vbc - vb2), \text{ when } vb2 < \theta < vbc \quad (9)$$

where abs denotes the operation of computing an absolute value. rvv(θ) is a relative view value dependent on the view angle. In an embodiment of the present invention, tha(θ) may be determined for the view angle, in accordance with equation (10):

$$tha(\theta) = (1.0 - rvv(\theta) * rvv(\theta) * rvv(\theta)) * kva \quad (10)$$

where kva is a constant that is independent of the view angle. kva therefore assists in controlling a magnitude of tha(θ). In an exemplary embodiment of the present invention, the value of kva is 1.5.

At 406, the initial filtering threshold is adjusted. The initial filtering threshold is adjusted independent of the amplitude of the signals received from detector 108.

The initial filtering threshold is adjusted when smoothing processor 112 subtracts tha(θ) from a threshold index of the initial filtering threshold. In an exemplary embodiment of the present invention, tha(θ) may be subtracted from the threshold index, in accordance with equation (11):

$$thmf = thm - tha(\theta) \qquad (11)$$

In an exemplary embodiment of the present invention, one, two or all of thresholds Th, Tm, and Tl may be adjusted by smoothing processor 112. In another exemplary embodiment of the present invention, more than three thresholds may be adjusted by smoothing processor 112.

In various embodiments of the present invention, smoothing processor 112 generates at least one of adjusted thresholds Th, Tm, and Tl. The adjusted thresholds Th, Tl, and Tm are generated in accordance with equations (12), (13), and (14):

$$Th = \exp(-thhf) \qquad (12)$$

$$Tm = \exp(-thmf), \text{and} \qquad (13)$$

$$Tl = \exp(-thlf), \qquad (14)$$

where, in an embodiment of the present invention, thhf may be computed by smoothing processor 112 in accordance with equation (15):

$$thhf = thmf - ath, \qquad (15)$$

In an embodiment of the present invention, thlf may be computed by smoothing processor 112 in accordance with equation (16)

$$thlf = thmf + bth. \qquad (16)$$

At 408, the scan data is filtered, based on the adjusted threshold.

In various embodiments of the present invention, smoothing processor 112 may be configured to filter the scan data, based on the adjusted threshold.

Figure 5:
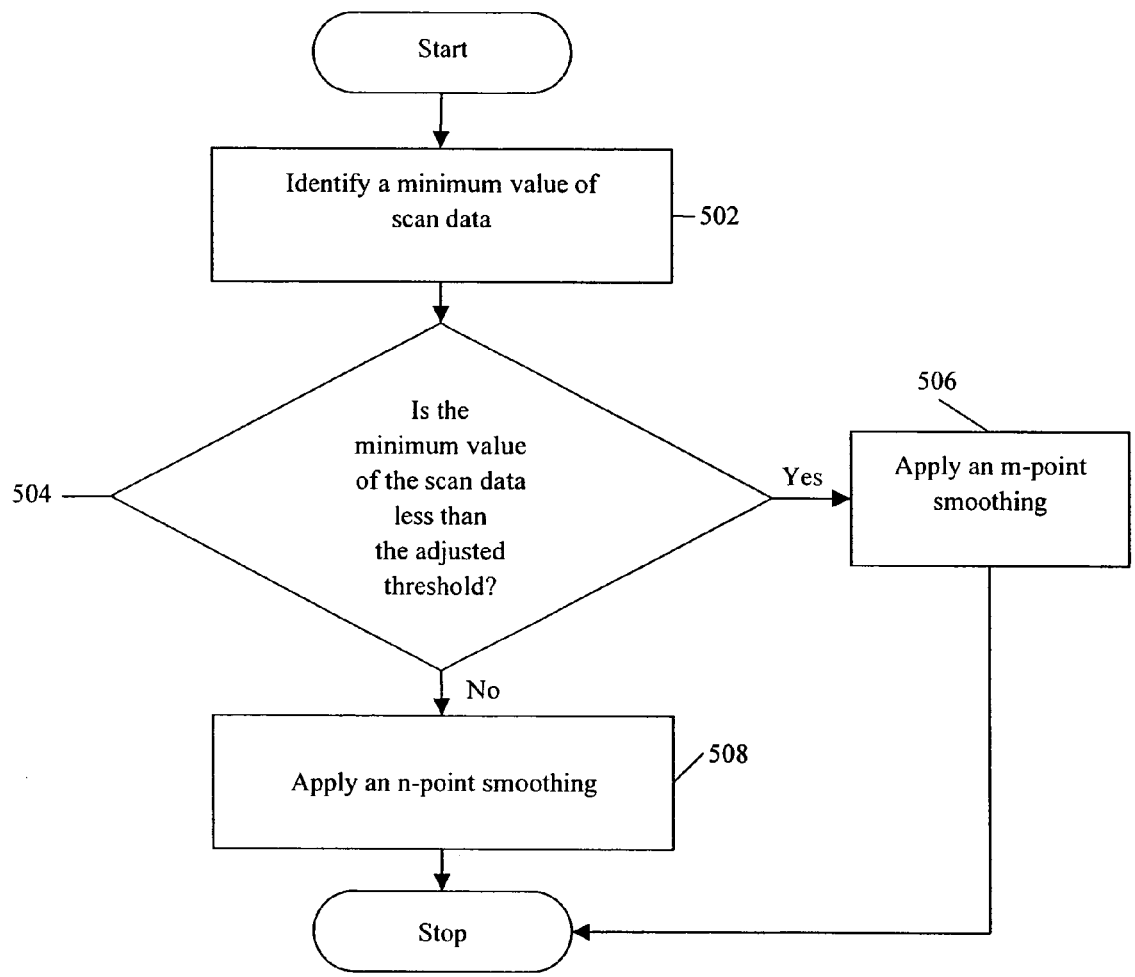
FIG. 5 is a flowchart illustrating a method for filtering scan data based on an adjusted threshold, in accordance with an exemplary embodiment of the invention.

FIG. 5 is a flowchart illustrating a method for filtering or smoothing scan data based on the adjusted threshold, in accordance with an exemplary embodiment of the invention. At 502, smoothing processor 112 identifies a minimum value from scan data obtained at a particular view angle. The scan data are three-dimensional (3D) vectors, including a first, a second, and a third vector. The first vector provides a detector row value. The second vector provides a detector channel value. The third vector provides a view angle value. For each view angle and each detector row there are multiple detector channel values. For every view angle and detector row, the minimum value from the detector channel values is identified.

At 504, smoothing processor 112 compares the minimum value of scan data with the adjusted threshold. If the minimum value of scan data is less than the adjusted threshold, smoothing processor 112 applies an m-point smoothing at 506 on the scan data obtained at a view angle corresponding to the minimum value, otherwise applies an n-point smoothing at 508 on the scan data obtained at a view angle corresponding to the minimum value. m is a number greater than n. In an embodiment of the present invention, the values of m and n may be an odd value ranging from 1 to 9. In an exemplary embodiment of the present invention, the values of m may be 3, 5, 7 or 9 and the values of n may be 3, 5, or 7.

Smoothing processor 112 may apply different weights to n or m-point smoothing. In an exemplary embodiment of the present invention, a 3-point smoothing has ⅓, ⅓, and ⅓ as the weights. In an exemplary embodiment of the present invention, a filtered scan data may be computed in accordance with equation (17):

$$F(i) = \tfrac{1}{3} * f(i-1) + \tfrac{1}{3} * f(i) + \tfrac{1}{3} * f(i+1), \qquad (17)$$

where f(i−1), f(i) and f(i+1) is the scan data adjacent along a detector channel or a detector row and F(i) is the filtered scan data. In another exemplary embodiment of the present invention, a 3-point smoothing has 0.25, 0.50, and 0.25 as the weights.

Figure 6:
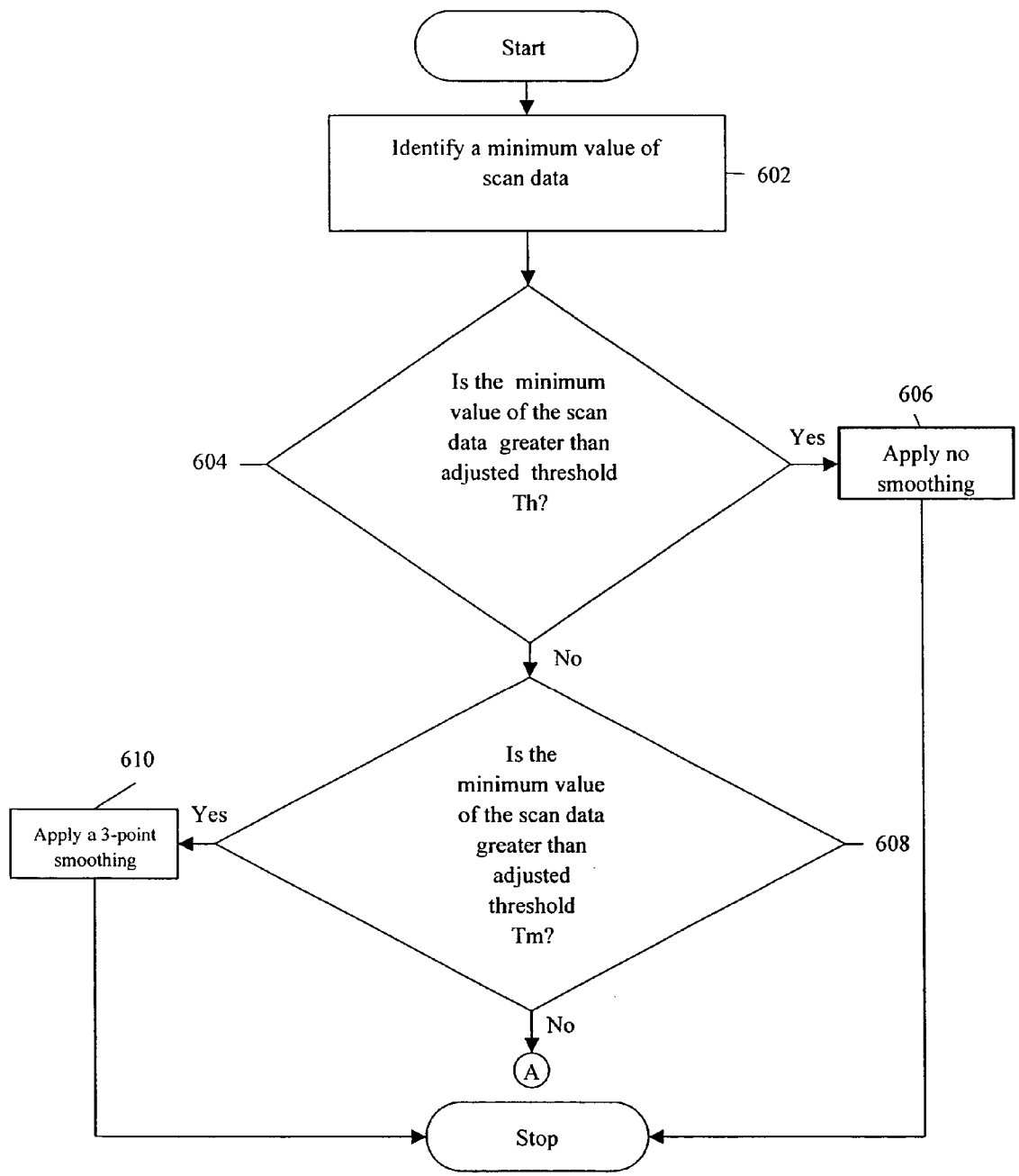
FIG. 6 is a flowchart illustrating a method for filtering scan data based on an adjusted threshold, in accordance with another exemplary embodiment of the invention.
Figure 7:
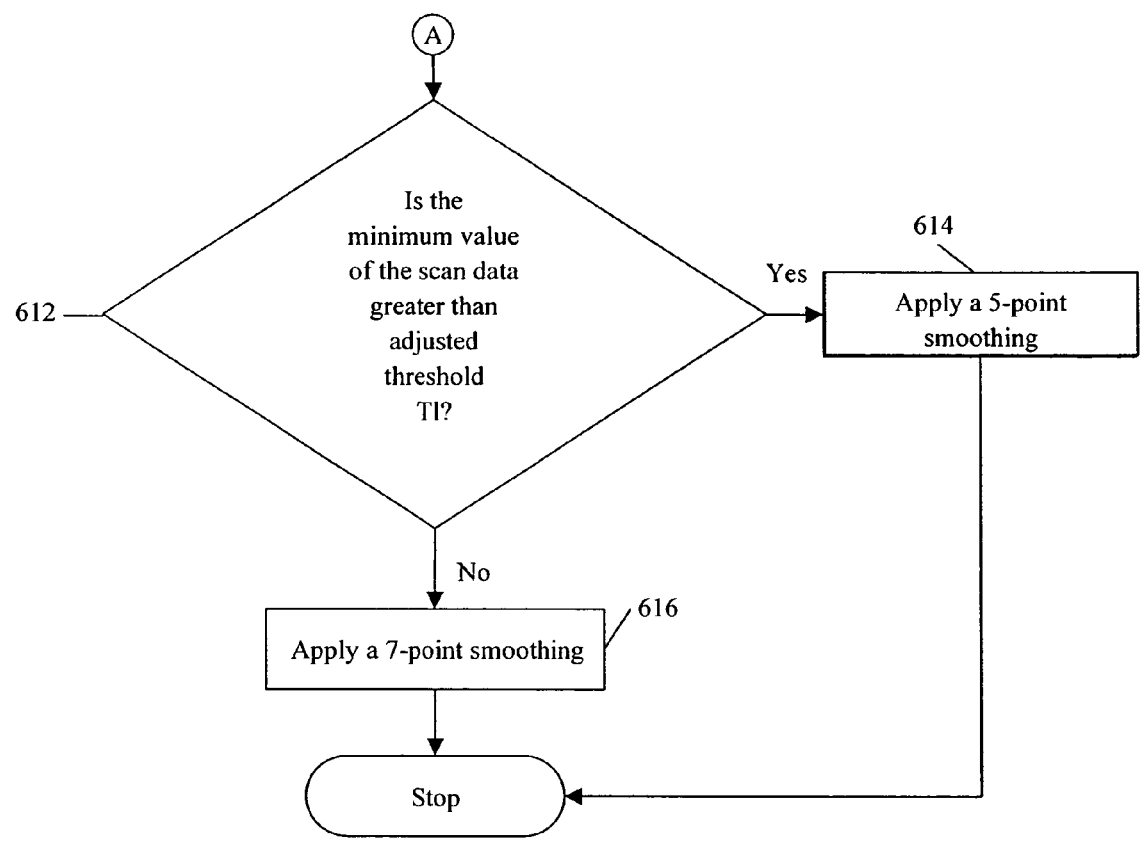
FIG. 7 is a continuation of the flowchart of FIG. 6, in accordance with another exemplary embodiment of the invention.

FIGS. 6 and 7 is a flowchart illustrating a method for filtering scan data, based on an adjusted threshold, in accordance with another exemplary embodiment of the invention. At 602, the minimum value of scan data is identified. At 604, the minimum value of scan data is compared with the adjusted threshold. In an embodiment of the present invention, smoothing processor 112 compares the minimum value of scan data with adjusted threshold Th. If smoothing processor 112 determines that the minimum value is greater than or equal to adjusted threshold Th, smoothing processor 112 does not apply smoothing at 606. If the minimum values is less than the adjusted threshold Th, smoothing processor 112 compares the minimum value with adjusted threshold Tm at 608. If smoothing processor 112 determines that the minimum value is greater than or equal to the adjusted threshold Tm, smoothing processor applies a 3-point smoothing at 610. If smoothing processor 112 determines that the minimum value is less than Tm, the processor compares the minimum value of the scan data with adjusted threshold Tl at 612. If smoothing processor 112 determines the minimum value is greater than or equal to the adjusted threshold Tl, smoothing processor 112 applies a 5-point smoothing at 614. If smoothing processor 112 determines that the minimum value is less than Tl, the processor applies a 7-point smoothing to the scan data at 616.

Smoothing processor 112 generates error projections by subtracting the filtered scan data from the scan data. Smoothing processor 112 multiplies the error projections by a smoothing gain factor to form new projections. The new projections are used to reconstruct images. The smoothing gain factor is a function of the scan data and approximately equal to 1.0 when the scan data is negligible.

Figure 8:
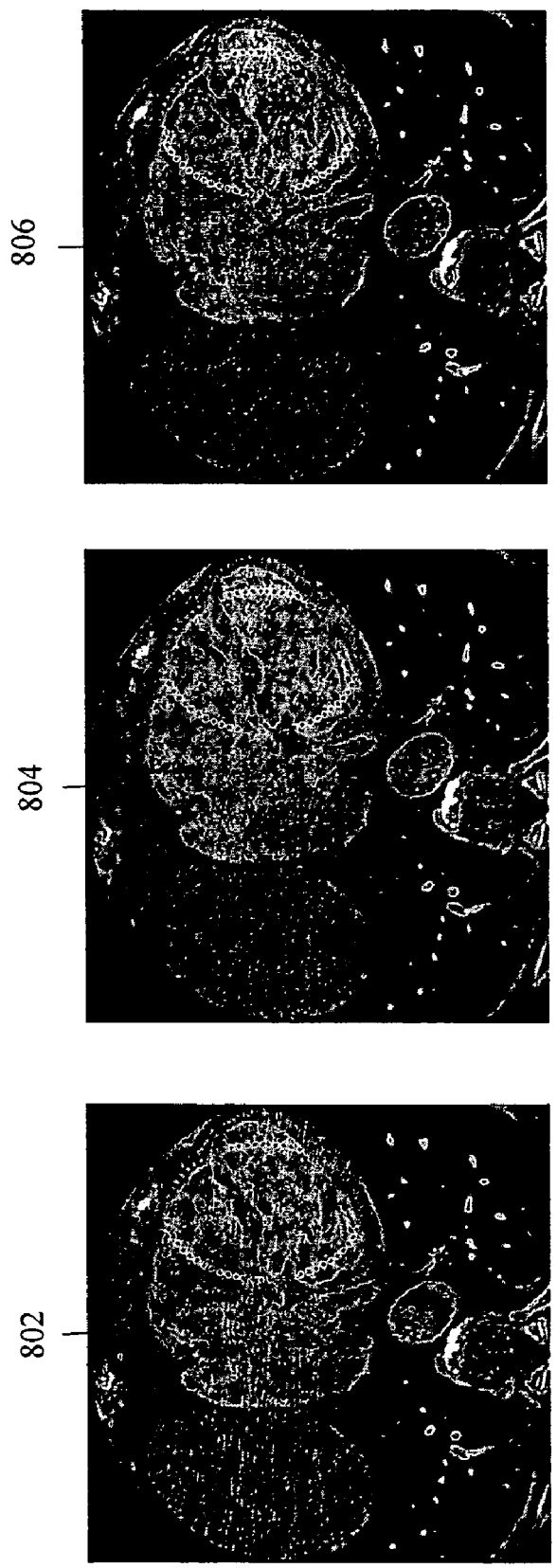
FIG. 8 shows images obtained by performing cardiac scans on patients, to illustrate the effects of applying the methods for filtering scan data, in accordance with an exemplary embodiment of the invention.

FIG. 8 shows images obtained by performing cardiac scans on patients to illustrate the effects of applying the methods for filtering scan data, in accordance with an exemplary embodiment of the invention. Image 802 is reconstructed by using the conventional reconstruction method. Image 802 contains horizontal and slanted streaks lined up with a heart, an aorta and a vertebra. Image 804 is reconstructed by using a standard adaptive filtering algorithm. Image 804 shows reduced horizontal streaks caused by a long-path length. Image 806 is reconstructed by employing the methods for filtering scan data, in accordance with an exemplary embodiment of the invention. The horizontal streaks and the directional streaks lined up with the heart and the vertebra are reduced in image 806.

The various embodiments of the present invention provide a medical imaging system that reduces directional streaking artifacts within the images. Further, the various embodiments of the present invention provide a medical imaging system that enables triggering the filtering, even at higher signal levels of the detector. In addition, the various embodiments of the present invention provide a medical imaging system that reduces noise-induced banding artifacts. Furthermore, the various embodiments of the present invention provide a medical imaging system that enables doctors to use scans with a low dose of X-ray radiation.

A technical effect of the various embodiments of the present invention is to reduce directional streaking artifacts within the images. Still another technical effect of the present invention is that doctors are able to use scans with a low dose of X-ray radiation.

Although the various embodiments mentioned above refers to a third generation CT system, methods for filtering scan data equally apply to fourth generation CT systems that have a stationary detector and a rotating X-ray source. The methods for filtering scan data further apply to fifth generation CT systems that have a stationary detector and an X-ray source.

Additionally, although the herein described methods are described in a medical setting, it is contemplated that the benefits of the methods accrue to non-medical imaging systems such as those systems typically employed in an industrial setting or a transportation setting, such as, for example, but not limited to, a baggage scanning system for an airport, other transportation centers, government buildings, office buildings, and the like. The benefits also accrue to micro PET and CT systems sized to study lab animals as opposed to humans.

The various embodiments or components thereof may be implemented as part of a computer system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device can also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method for filtering scan data, said method comprising:
   generating scan data from a plurality of signals using a computed tomography system;
   adjusting a first initial filtering threshold and a second initial filtering threshold independently of an amplitude of the plurality of signals to generate a first adjusted filtering threshold from the first initial filtering threshold and a second adjusted filtering threshold from the second initial filtering threshold;
   associating a first degree of smoothing with the first adjusted filtering threshold and a second degree of smoothing with the second adjusted filtering threshold, wherein the first degree of smoothing is different than the second degree of smoothing; and
   filtering the scan data using one of the first degree of smoothing and the second degree of smoothing.

2. A method in accordance with claim 1 further comprising reducing directional streaks within an image by filtering the scan data.

3. A method in accordance with claim 1 wherein the scan data comprises one of a heart, vertebra, and aorta projection data.

4. A method in accordance with claim 1 further comprising determining a threshold adjustment tha($\theta$), at least one of the first initial filtering threshold and the second initial filtering threshold adjusted based on the threshold adjustment tha($\theta$), wherein said determining a threshold adjustment tha($\theta$) comprises computing the threshold adjustment tha($\theta$) based on a constant kva that is independent of a view angle.

5. A method in accordance with claim 1 further comprising:
   determining a threshold adjustment tha($\theta$), at least one of the first initial filtering threshold and the second initial filtering threshold adjusted based on the threshold adjustment tha($\theta$), wherein said adjusting comprises subtracting the threshold adjustment tha($\theta$) from a threshold index.

6. A method for filtering scan data, said method comprising:
   computing a first initial filtering threshold and a second initial filtering threshold;
   adjusting the first initial filtering threshold and the second initial filtering threshold based on a view angle of an imaging system to generate a first adjusted filtering threshold from the first initial filtering threshold and a second adjusted filtering threshold from the second initial filtering threshold;

associating a first degree of smoothing with the first adjusted filtering threshold and a second degree of smoothing with the second adjusted filtering threshold, wherein the first degree of smoothing is different than the second degree of smoothing; and displaying the scan data after filtering the scan data using one of the first degree of smoothing and the second degree of smoothing.

7. A method in accordance with claim 6 wherein said adjusting comprises changing at least one of the first initial filtering threshold and the second initial filtering threshold based on pre-determined ranges of values between which the view angle is located.

8. A method in accordance with claim 6 further comprising:

performing said filtering before performing a logarithmic operation.

9. A method in accordance with claim 6 further comprising:

smoothing by applying an m-point smoothing when a minimum value of the scan data is below one of the first adjusted filtering threshold and the second adjusted filtering threshold; and smoothing by applying an n-point smoothing when a minimum value of the scan data is above one of the first adjusted filtering threshold and the second adjusted filtering threshold, wherein m is greater than n.

10. A method in accordance with claim 6 further comprising determining a threshold adjustment tha($\theta$), at least one of the first initial filtering threshold and the second initial filtering threshold adjusted based on the threshold adjustment tha($\theta$), wherein said determining a threshold adjustment tha($\theta$) comprises computing the threshold adjustment tha($\theta$) based on a constant kva that is independent of the view angle.

11. A method in accordance with claim 6 further comprising determining a threshold adjustment tha($\theta$), at least one of the first initial filtering threshold and the second initial filtering threshold adjusted based on the threshold adjustment tha($\theta$), wherein said adjusting comprises subtracting the threshold adjustment tha($\theta$) from a threshold index.

12. A computed tomography system comprising:

a detector configured to receive signals;

a data acquisition system configured to generate scan data from signals received by the detector; and a smoothing processor configured to:

adjust a first initial filtering threshold and a second initial filtering threshold independently of an amplitude of the received signals based on pre-determined ranges of values between which a view angle is located;

generate a first adjusted filtering threshold from the first initial filtering threshold and a second adjusted filtering threshold from the second initial filtering threshold;

associate a first degree of smoothing with the first adjusted filtering threshold and a second degree of smoothing with the second adjusted filtering threshold, wherein the first degree of smoothing is different than the second degree of smoothing; and filter the scan data based on one of the first degree of smoothing and the second degree of smoothing.

13. A computed tomography system in accordance with claim 12 wherein said smoothing processor is configured to reduce directional streaks within an image by filtering the scan data.

14. A computed tomography system in accordance with claim 12 wherein the scan data includes one of heart, vertebra, and aorta projection data.

15. A computed tomography system in accordance with claim 12 wherein said smoothing processor is configured to determine a threshold adjustment tha($\theta$) and adjust at least one of the first initial filtering threshold and the second initial filtering threshold based on the threshold adjustment tha($\theta$), the threshold adjustment tha($\theta$) based on a constant kva that is independent of a view angle.

16. A computed tomography system in accordance with claim 12 wherein said smoothing processor is configured to:

determine a threshold adjustment tha($\theta$);

adjust at least one of the first initial filtering threshold and the second initial filtering threshold based on the threshold adjustment tha($\theta$); and subtract the threshold adjustment tha($\theta$) from a threshold index.

\* \* \* \* \*